United States Patent
Torrey

(10) Patent No.: US 9,246,429 B2
(45) Date of Patent: Jan. 26, 2016

(54) CONTROL METHOD FOR REDUCING TORQUE RIPPLE IN SWITCHED RELUCTANCE MOTORS

(71) Applicant: GENERAL ELECTRIC COMPANY, Schenectady, NY (US)

(72) Inventor: David Allan Torrey, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 7 days.

(21) Appl. No.: 14/299,116

(22) Filed: Jun. 9, 2014

(65) Prior Publication Data

US 2015/0236633 A1 Aug. 20, 2015

Related U.S. Application Data

(60) Provisional application No. 61/942,199, filed on Feb. 20, 2014.

(51) Int. Cl.
*H02P 25/08* (2006.01)

(52) U.S. Cl.
CPC .................. *H02P 25/088* (2013.01)

(58) Field of Classification Search
CPC .................................................. H02P 25/088
USPC ....................................... 318/254.1, 432, 443
See application file for complete search history.

(56) References Cited

U.S. PATENT DOCUMENTS

| | | | | |
|---|---|---|---|---|
| 5,844,343 | A * | 12/1998 | Horst | H02K 1/246 310/168 |
| 6,150,791 | A | 11/2000 | Fulton | |
| 6,788,021 | B2 | 9/2004 | Sozer et al. | |
| 6,864,658 | B1 | 3/2005 | Torrey et al. | |
| 7,161,314 | B2 * | 1/2007 | Nakai | H02P 6/24 318/400.4 |
| 7,768,220 | B2 | 8/2010 | Schulz et al. | |
| 8,294,317 | B2 * | 10/2012 | Kamida | A61B 5/0488 310/102 R |
| 2009/0021192 | A1 | 1/2009 | Kudligi | |
| 2010/0141061 | A1 | 6/2010 | Ramu et al. | |
| 2012/0175997 | A1 | 7/2012 | Lee et al. | |
| 2013/0221889 | A1 | 8/2013 | Kim et al. | |

FOREIGN PATENT DOCUMENTS

WO 2011030499 A1 3/2011

OTHER PUBLICATIONS

Moon et al., "Switched Reluctance Motor With 2-Phase Excitation", Industry Applications Conference, 1998. Thirty-Third IAS Annual Meeting. The 1998 IEEE (vol. 1), pp. 547-552, Oct. 12-15, 1998.

(Continued)

*Primary Examiner* — David S Luo
(74) *Attorney, Agent, or Firm* — Joseph J. Christian

(57) ABSTRACT

A method of controlling torque ripple in a switched reluctance motor (SRM) includes splitting each phase winding of the SRM into an AC winding and a DC winding. The AC winding of each phase winding is excited with symmetrically displaced sinusoidal currents that may be projected into a reference frame that moves synchronously with the SRM rotor.

13 Claims, 6 Drawing Sheets

(56) References Cited

OTHER PUBLICATIONS

Rabinovici, "Torque Ripple, Vibrations, and Acoustic Noise in Switched Reluctance Motors", HAIT Journal of Science and Engineering B, vol. 2, Issues 5-6, pp. 776-786, Jul. 10, 2005.

Yilmaz et al., "Advanced Control Techniques for Switched Reluctance Machine Drives in Emerging Applications", Energy Conversion Congress and Exposition (ECCE), 2013 IEEE, pp. 3776-3783, Sep. 15-19, 2013.

* cited by examiner

CONTROL METHOD FOR REDUCING TORQUE RIPPLE IN SWITCHED RELUCTANCE MOTORS

CLAIM TO PRIORITY OF PROVISIONAL APPLICATION

This application claims priority under 35 U.S.C. §119(e)(1) of provisional application Ser. No. 61/942,199, filed Feb. 20, 2014, by David Allan Toney, incorporated by reference herein in its entirety.

BACKGROUND

The subject matter of this disclosure relates generally to switched reluctance motors, and more particularly, to a control method for reducing torque ripple in switched reluctance motors.

The switched reluctance motor (SRM) is a simple and robust electric machine that can be attractive for a number of applications due to the absence of permanent magnets or windings on the rotor. A limiting factor in the application of SRMs is the torque ripple produced by the machine as torque production is passed from one phase to another. In the past, it was possible to reduce torque ripple produced by the SRM only over a limited speed range and with the use of sophisticated current regulators.

Control of the SRM is complicated by the spatial and magnetic nonlinearities inherent to the machine. The traditional approach to SRM excitation is to design the current waveform for each phase, and implement those current waveforms independently of one another. This requires an inverter structure that is different from the inverter structure that is used for other types of AC machines, such as permanent magnet synchronous and induction machines.

In view of the foregoing, there is a need for a method of reducing torque ripple in switched reluctance motors that facilitates the use of a standard inverter topology, combined with a simpler current regulation algorithm.

BRIEF DESCRIPTION

According to one embodiment, a method of reducing torque ripple in a switched reluctance motor comprises:

splitting each phase winding of a switched reluctance motor (SRM) into an AC winding and a DC winding;

exciting the AC winding of each phase winding with symmetrically displaced sinusoidal currents; and exciting the DC winding of all phase windings with a varying DC current based on spatially varying magnetic properties of the SRM.

According to another embodiment, a method of reducing torque ripple in a switched reluctance motor comprises:

splitting each phase winding of a switched reluctance motor (SRM) into an AC winding and a DC winding; and exciting the AC winding of each phase winding with symmetrically displaced sinusoidal currents that are projected into a reference frame the moves synchronously with the SRM rotor.

According to yet another embodiment, a method of reducing torque ripple in a switched reluctance motor comprises:

splitting each phase winding of a switched reluctance motor (SRM) into an AC winding and a DC winding;

exciting the DC winding of all phase windings with a varying DC current based on spatially varying magnetic properties of the SRM; and exciting the AC winding of each phase winding with symmetrically displaced sinusoidal currents that vary in response to the varying DC current.

DRAWINGS

These and other features, aspects, and advantages of the present invention will become better understood when the following detailed description is read with reference to the accompanying drawings, wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Some basic switched reluctance motor principles are first presented to provide a background to better understand the embodiments described herein that are directed to control methods for reducing torque ripple in switched reluctance motors.

Figure 1:
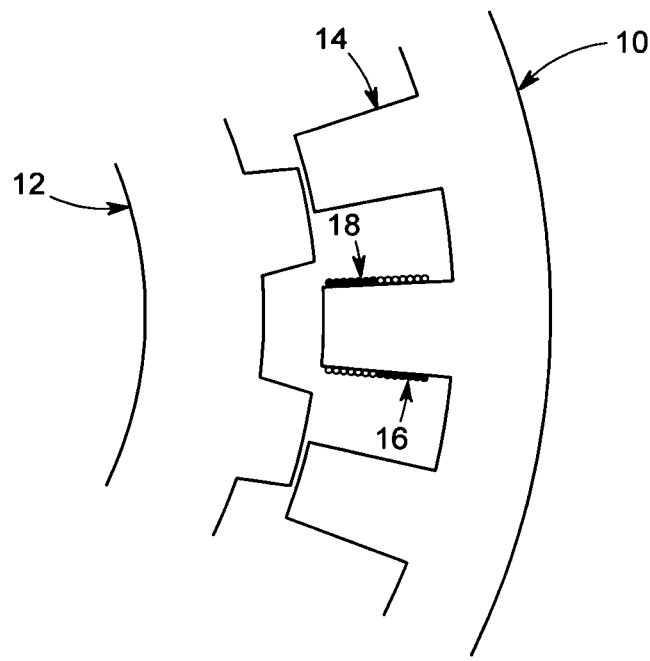
FIG. 1 is an axial view illustrating one portion of stator and rotor laminations for a switched reluctance motor, according to one embodiment.

FIG. 1 is an axial view illustrating one portion of stator and rotor laminations 10, 12 for a switched reluctance motor, according to one embodiment. The stator laminations 10 comprise a plurality of teeth 14. One or more short-pitch, concentrated windings are wound around each of the plurality of stator teeth 14. The short-pitch, concentrated windings may include an AC winding 16 and a DC winding 18, according to one embodiment. The term "short pitch, concentrated" as used herein means that each stator winding wraps around only one stator tooth 14. The rotor laminations 12 are devoid of windings or permanent magnets and the rotor comprises salient magnetic poles. The number of salient poles on the stator and rotor will necessarily be different to support torque production at all rotor positions. The stator and rotor poles are symmetrically displaced in space. The AC winding 16 on each stator tooth is associated with a particular phase winding. The magnetic polarity of the AC windings and DC windings is set by the number of stator teeth 14 and the number of rotor teeth.

An SRM has both spatial nonlinearities and magnetic nonlinearities. Spatial nonlinearities means that the inductance of each stator coil is a function of rotor position, and the variation is nonlinear. Further, the magnetic steel that is used to form the stator and rotor laminations 10, 12 is able to saturate, and so the properties of the magnetic steels changes with corresponding changes in phase winding current.

Figure 2:
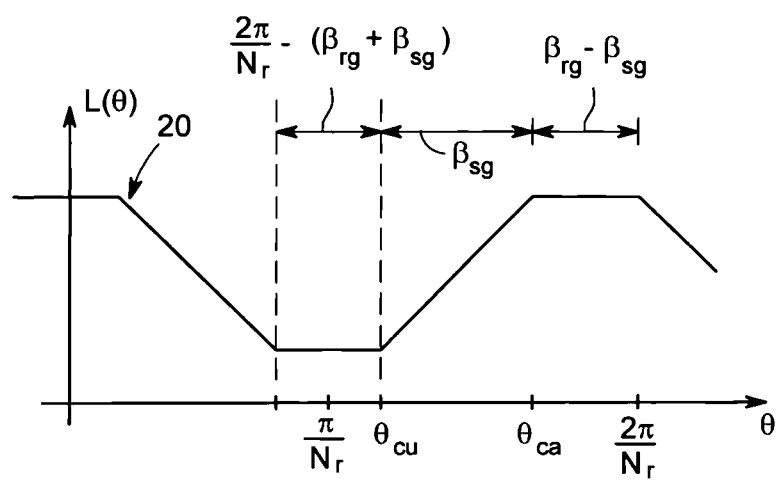
FIG. 2 is a graph illustrating an idealized inductance profile showing spatial nonlinearities for one stator winding of a switched reluctance motor, according to one embodiment.

FIG. 2 is a graph 20 illustrating an idealized inductance profile showing spatial nonlinearities for one stator winding of a switched reluctance motor, according to one embodiment. The inductance $L(\theta)$ can be seen to vary from a maximum value to a minimum value and results in a trapezoidal waveform. The periodicity of the inductance is set by the number of rotor teeth.

Figure 3:
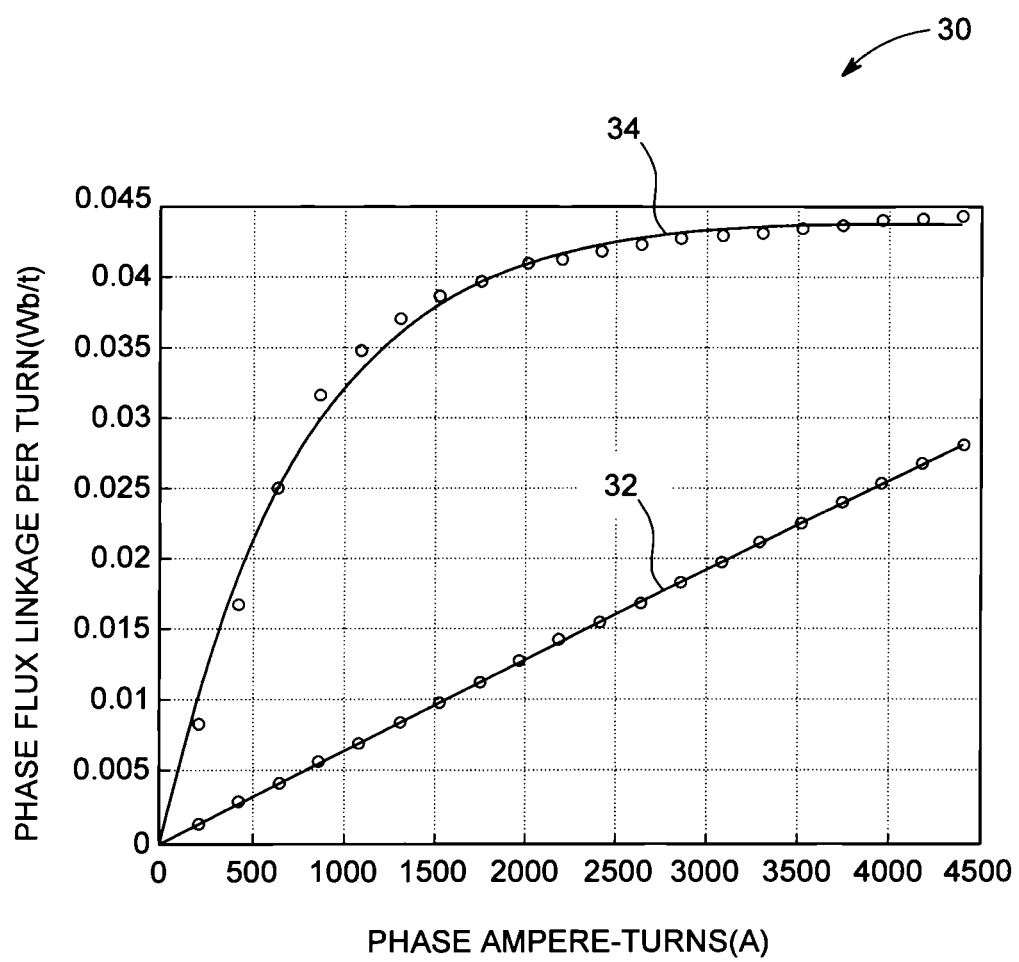
FIG. 3 is a graph illustrating magnetic nonlinearities due to saturating steel associated with a switched reluctance motor, according to one embodiment.

FIG. 3 is a graph 30 illustrating magnetic nonlinearities due to saturating steel associated with a switched reluctance motor, according to one embodiment. The bottom line 32 represents the phase flux linkage as a function of current when the rotor is in the minimum inductance position. The upper curved line 34 represents the phase flux linkage as a function of current when the rotor is in the maximum inductance position. It will be appreciated that the combination of spatial and magnetic nonlinearities makes torque production a function of rotor position and the currents in each phase winding.

Figure 4:
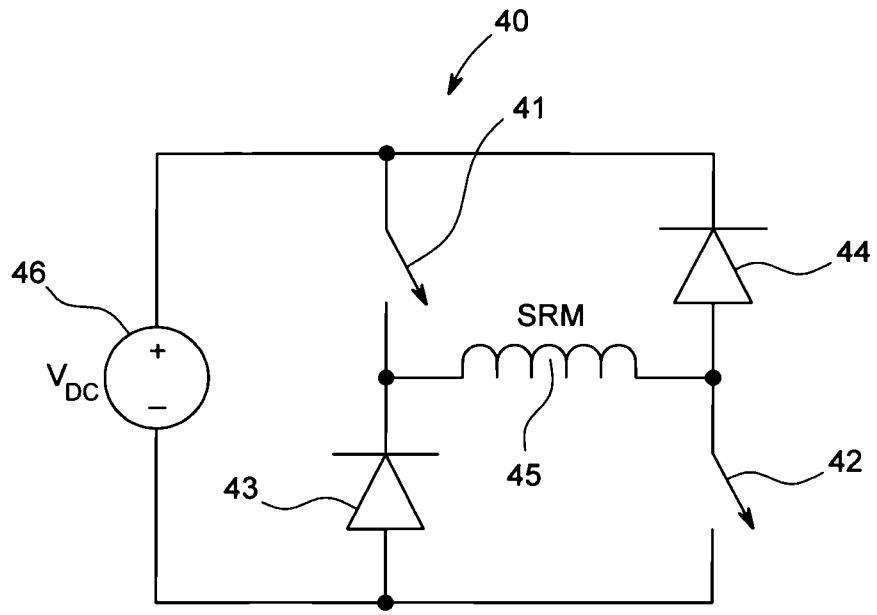
FIG. 4 is a simplified schematic illustrating a typical inverter structure associated with one phase of a switched reluctance motor.

FIG. 4 is a simplified schematic illustrating a typical inverter structure 40 associated with one phase of a switched reluctance motor. The inverter 40 comprises a pair of controllable switches 41, 42 and a pair of diodes 43, 44 connected to one phase 45 of a switched reluctance motor. A three phase switched reluctance motor, for example, will comprise three such inverters 40 connected together in parallel. When both switches 41, 42 are closed, current is driven into the phase winding 45. One of the switches 41, 42 is operated in a pulsed mode, opening and closing the switch, in order to regulate the phase current. Passing current out of the phase winding 45 is accomplished by opening both switches 41, 42 which then allows stored phase energy to force both diodes to transition into their respective conduction modes, allowing the phase current to flow back to the power source 46.

Figure 5:
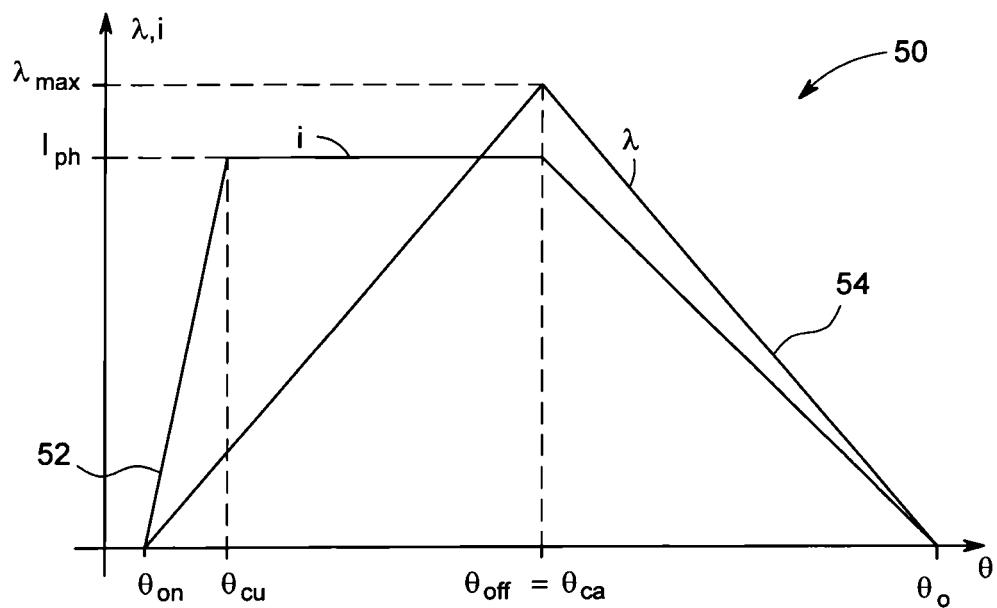
FIG. 5 is a graph illustrating idealized phase current and flux linkages of a switched reluctance motor controlled through switching action of the inverter shown in FIG. 4 while operating at base speed, according to one embodiment.

FIG. 5 is a graph 50 illustrating one phase current 52 of a switched reluctance motor controlled through switching action of the inverter 40 shown in FIG. 4, according to one embodiment. The phase current i builds up following closure of the controllable switches 41, 42, and reaches a constant level $I_{ph}$ that is maintained by operation of the motor at base speed where the phase currents are self-regulated. It will be appreciated that a current waveform of similar shape can be created in response to the aforementioned pulsing operation of one of the controllable switches 41, 42. When both controllable switches 41, 42 are opened, the phase current i drops off as quickly as possible. The slope between $\theta_{on}$ and $\theta_{cu}$ can be seen to be smaller than the slope between $\theta_{off}$ and $\theta_o$. This is because $\theta_{on}$ is near the minimum inductance position and current rises faster with a smaller inductance; wherein $\theta_o$ is in a position where the inductance is larger which causes the current transition period to increase. The foregoing operating principles can be seen to cause the phase flux linkage 54 to rise and fall in a substantially linear manner for operation at base speed. It will be appreciated that even though the phase current is controlled to be nominally constant, the torque produced by the excited phase will not be constant because of the aforementioned spatial and magnetic nonlinearities. The variation in torque production with position, in conjunction with moving the responsibility for torque production from one phase to another, creates both average torque and torque ripple. Torque ripple is a known attribute of switched reluctance motors.

Switched reluctance motor phase currents are typically thus controlled by three parameters including turn-on angle, turn-off angle, and nominal phase current. At high speeds, the phase currents are self-regulated by the limited voltage. At low speeds, the phase currents are regulated through switching action of the inverter 40. It will be appreciated that adding additional degrees of freedom to the phase current profile will allow greater control over the torque produced by each phase, thereby offering the possibility of controlling torque ripple as torque production is passed from one phase to another phase. More sophisticated current regulation methods are still limited to low speeds where the inverter has the ability to shape the phase currents.

With continued reference to FIG. 5, it can be observed that a repeating phase current 52 produces an average component and an alternating component. Thus, one option for changing the excitation of the switched reluctance motor windings comprises splitting each phase winding into two pieces. A nominally constant current may then be applied to one of the pieces, while an alternating current may be applied to the remaining piece.

Figure 6:
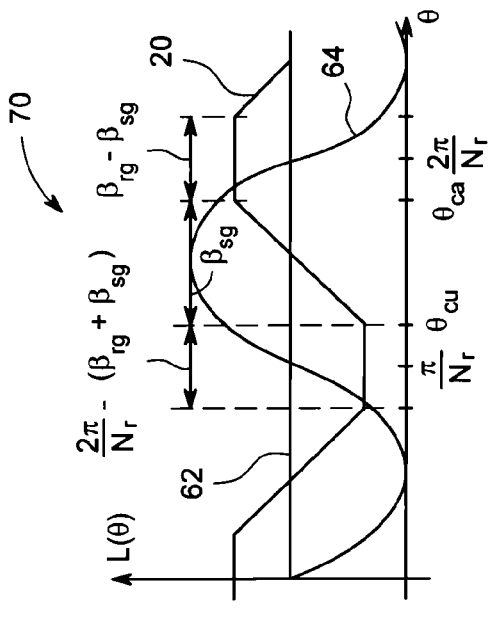
FIG. 6 is a graph illustrating excitation of a switched reluctance motor by decomposing each phase current into the superposition of a DC current with an AC current waveform, according to one embodiment.

FIG. 6 is a graph 60 illustrating excitation of a switched reluctance motor by decomposing each phase current into the superposition of a DC current 62 with an AC current waveform 64, according to one embodiment.

Figure 7:
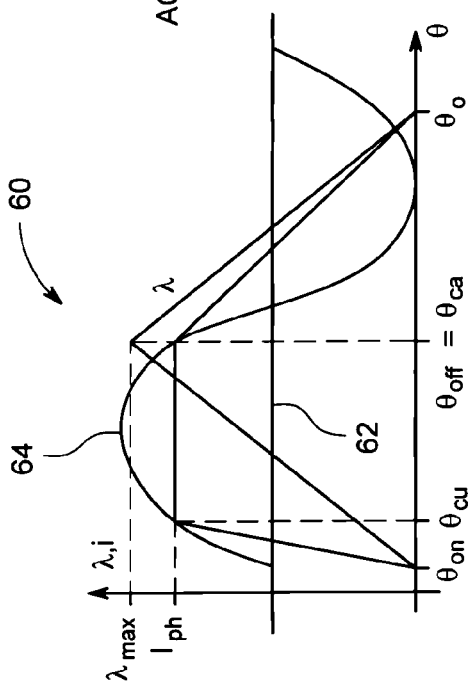
FIG. 7 is a graph illustrating the AC current waveform and the DC current shown in FIG. 6 aligned with a switched reluctance motor inductance profile to preferentially produce torque, according to one embodiment.

FIG. 7 is a graph 70 showing the AC component 64 and the DC component 62 aligned with the inductance profile to preferentially produce positive torque. The AC component 64 may be produced by an inverter 40 such as shown in FIG. 4, (with the diodes replaced by controllable switches similar to controllable switches 41, 42), while a separate DC current generator circuit (not shown) may be employed to produce the DC component 62. Switched reluctance motor torque ripple reduction may also be achieved, for example, by changing the SRM magnetic circuit or by changing the magnetic circuit in combination with the torque ripple reduction principles described herein. It will be appreciated that if the AC component of the currents sourced to the SRM phase windings are symmetrically displaced in time, it is no longer necessary to use the inverter topology of FIG. 4. Instead, a conventional inverter topology using two controllable switches per phase can be used, where the AC windings are connected in a Y or Δ configuration as in conventional AC machines, e.g. an induction motor.

Figure 8:
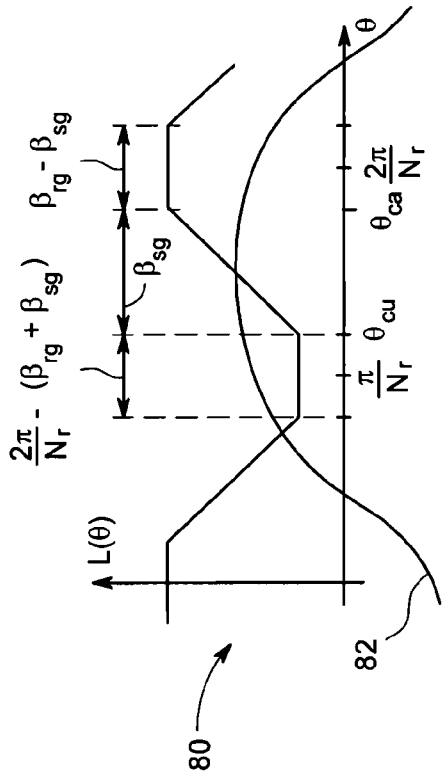
FIG. 8 is a graph illustrating excitation of a switched reluctance motor by changing each phase current to an AC waveform, allowing use of a conventional three-phase inverter topology, according to one embodiment.

FIG. 8 is a graph 80 illustrating excitation of a switched reluctance motor by changing each phase current to an AC waveform 82, allowing use of a conventional inverter topology that only has two controllable switches per phase, according to another embodiment. It should be noted that decomposing each phase current into the superposition of a DC component 62 with an AC component advantageously allows a greater ability to produce the desired torque over a wider speed range than that achievable when simply changing each phase current to an AC waveform 82. Simply changing each phase current to an AC waveform 82 advantageously allows use of conventional inverter topologies, as stated herein, without the need for exciting a DC winding.

Figure 9:
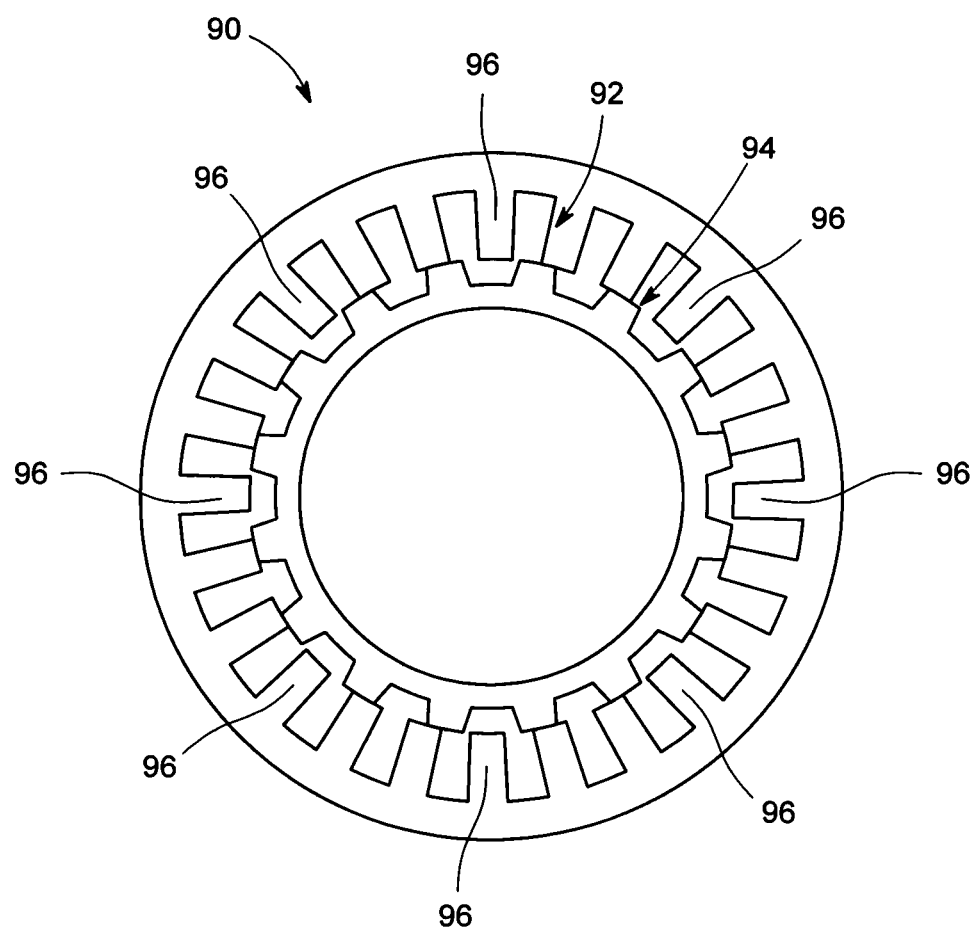
FIG. 9 shows a typical lamination set for a switched reluctance motor suitable for use in association with the torque ripple control principles described herein.

FIG. 9 shows a typical lamination set 90 for a switched reluctance motor suitable for use in association with the torque ripple control principles described herein. The lamination set 90 comprises 24 stator poles 92 and 18 rotor poles 94. The 24 stator poles 92 are split into three phases comprising eight stator poles 92 per phase winding. Thus, the rotor poles 94 and the stator poles 92 can be seen to have the same positions relative to one another at each third stator pole 92. The phase structure can be seen by looking at how the stator poles 92 align with the rotor poles 94. The stator poles 96 that are located at N, S, E, W, NE, SE, SW and NW, for example, are all centered between two rotor poles 94. Accordingly, these poles are associated with the same phase. The remaining phases can be determined by application of the same principles to the other phase structures.

Figure 10:
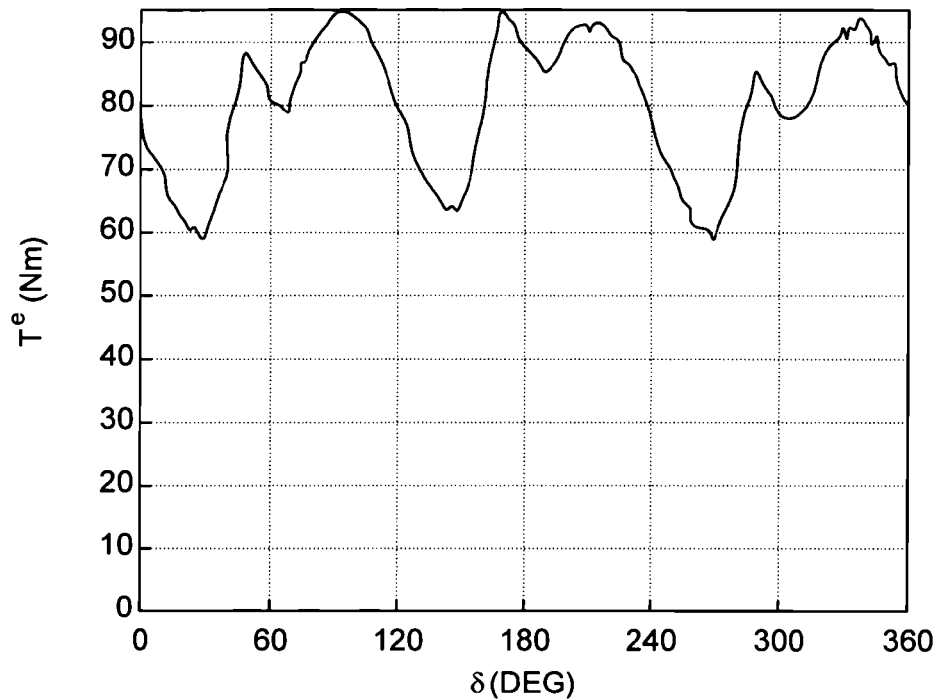
FIG. 10 is a graph illustrating electromagnetic torque production using a constant field current in a switched reluctance motor, according to one embodiment.

FIG. 10 is a graph illustrating electromagnetic torque production by a switched reluctance motor when using a constant field current in the switched reluctance motor, according to one embodiment. The AC phase currents are sinusoidal and symmetrically displaced in time. The variation in torque as a function of rotor position is evident; this torque variation is the torque ripple.

Figure 11:
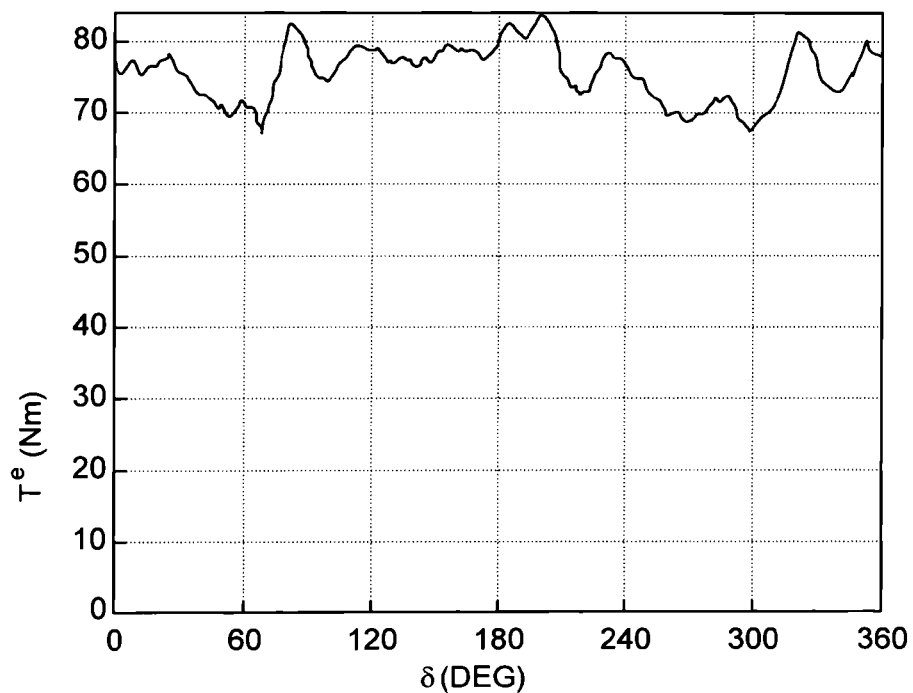
FIG. 11 is a graph illustrating electromagnetic torque production using a spatially varying field current in a switched reluctance motor, according to one embodiment.

FIG. 11 is a graph illustrating electromagnetic torque production by a switched reluctance motor when using a spatially varying field current in the switched reluctance motor, according to one embodiment. The present inventor recognized that since a switched reluctance motor three phase winding may utilize simple sinusoidal currents, the torque ripple may then be controlled for all phases of the switched reluctance motor by controlling a single current. The magnetic structure of the switched reluctance motor, for example, may be analyzed to determine how the single controlled current should vary with position in order to minimize torque ripple. According to one embodiment, the controlling current is a DC winding current $i_o$ represented in Eq. 1 as $$i_o = \sqrt{3} I f(\delta) \qquad \text{Eq. 1}$$

where $$f(\delta) = 1 + k_3[\sin(3\delta+\gamma) + \tan(\gamma)\cos(3\delta+\gamma)] + k_6[\sin(6\delta+\gamma) + \tan(\gamma)\cos(6\delta+\gamma)] \qquad \text{Eq. 2}$$

and where $\delta$ is angular degrees (position), $k_3$ and $k_6$ are constants, and $\gamma$ is a phase angle.

In summary explanation, a method of reducing torque ripple in a switched reluctance motor comprises splitting each phase winding of a switched reluctance motor (SRM) into an AC winding and a DC winding such that the AC windings may employ a conventional inverter topology, while the DC windings provide a lever to control the torque produced by the switched reluctance motor. The AC windings are excited with sinusoidal currents, allowing the phase currents to be projected into a reference frame that moves synchronously with the SRM rotor, and an average torque component and a ripple torque component are calculated therefrom. The DC windings associated with each phase winding are excited with a spatially varying current based on the ripple torque component.

Reference frame, as used herein, is a basis of orientation for construction of the currents that excite the motor. Using a stationary reference frame suggests, for example, the use of sinusoidal currents that create a rotating magnetic field. A rotating reference frame that is attached to the field that moves through the air gap of the motor suggests using currents that are constant relative to this reference frame. This reference frame that rotates with the air gap field is frequently referred to as the "d-q" reference frame. It is used to examine the control of AC machines from the same perspective as DC machines.

While the invention has been described in terms of various specific embodiments, those skilled in the art will recognize that the invention can be practiced with modification within the spirit and scope of the claims.

The invention claimed is:

1. A method of controlling torque ripple in a switched reluctance motor, the method comprising:
    splitting each phase winding of a switched reluctance motor (SRM) into an AC winding and a DC winding;
    exciting the AC winding of each phase winding with symmetrically displaced sinusoidal currents; exciting the DC winding of all phase windings with a varying DC current based on spatially varying magnetic properties of the SRM; and
    calculating the spatially varying magnetic properties of the SRM, wherein the spatially varying magnetic properties of the SRM are represented as $$f(\delta) = 1 + k_3[\sin(3\delta+\gamma) + \tan(\gamma)\cos(3\delta+\gamma)] + k_6[\sin(6\delta+\gamma) + \tan(\gamma)\cos(6\delta+\gamma)],$$

wherein $\delta$ is angular degrees (position), $k_3$ and $k_6$ are constants, and $\gamma$ is a phase angle.

2. The method of controlling torque ripple in a switched reluctance motor according to claim 1, wherein the varying DC current is represented as $i_o = \sqrt{3} I f(\delta)$, wherein I is a nominal DC current.

3. The method of controlling torque ripple in a switched reluctance motor according to claim 1, wherein exciting the AC winding of each phase winding with sinusoidal currents comprises projecting the phase currents into a reference frame that moves synchronously with the SRM rotor.

4. The method of controlling torque ripple in a switched reluctance motor according to claim 3, further comprising calculating the spatially varying magnetic properties of the SRM, wherein the spatially varying magnetic properties of the SRM are represented as $$f(\delta) = 1 + k_3[\sin(3\delta+\gamma) + \tan(\gamma)\cos(3\delta+\gamma)] + k_6[\sin(6\delta+\gamma) + \tan(\gamma)\cos(6\delta+\gamma)],$$

wherein $\delta$ is angular degrees (position), $k_3$ and $k_6$ are constants, and $\gamma$ is a phase angle.

5. The method of controlling torque ripple in a switched reluctance motor according to claim 4, wherein the varying DC current is represented as $i_o = \sqrt{3} I f(\delta)$, wherein I is a nominal DC current.

6. A method of controlling torque ripple in a switched reluctance motor, the method comprising:
    splitting each phase winding of a switched reluctance motor (SRM) into an AC winding and a DC winding; and
    exciting the AC winding of each phase winding with symmetrically displaced sinusoidal currents that are projected into a reference frame the moves synchronously with the SRM rotor, wherein the reference frame is based on spatially varying magnetic properties of the SRM.

7. The method of controlling torque ripple in a switched reluctance motor according to claim 6, further comprising calculating the spatially varying magnetic properties of the SRM, wherein the spatially varying magnetic properties of the SRM are represented as $$f(\delta)=1+k_3[\sin(3\delta+\gamma)+\tan(\gamma)\cos(3\delta+\gamma)]+k_6[\sin(6\delta+\gamma)+\tan(\gamma)\cos(6\delta+\gamma)],$$

wherein $\delta$ is angular degrees (position), $k_3$ and $k_6$ are constants, and $\gamma$ is a phase angle.

8. The method of controlling torque ripple in a switched reluctance motor according to claim 7, further comprising exciting the DC winding of each phase winding with a varying DC current, wherein the varying DC current is represented as $i_o=\sqrt{3}If(\delta)$, wherein I is a nominal DC current.

9. A method of controlling torque ripple in a switched reluctance motor, the method comprising:
 splitting each phase winding of a switched reluctance motor (SRM) into an AC winding and a DC winding;
 exciting the DC winding of all phase windings with a varying DC current based on spatially varying magnetic properties of the SRM;
 exciting the AC winding of each phase winding with symmetrically displaced sinusoidal currents that vary in response to a rotor position; and
 calculating the spatially varying magnetic properties of the SRM, wherein the spatially varying magnetic properties of the SRM are represented as $$f(\delta)=1+k_3[\sin(3\delta+\gamma)+\tan(\gamma)\cos(3\delta+\gamma)]+k_6[\sin(6\delta+\gamma)+\tan(\gamma)\cos(6\delta+\gamma)],$$

wherein $\delta$ is angular degrees (position), $k_3$ and $k_6$ are constants, and $\gamma$ is a phase angle.

10. The method of controlling torque ripple in a switched reluctance motor according to claim 9, wherein the varying DC current is represented as $i_o=\sqrt{3}If(\delta)$, wherein I is a nominal DC current.

11. A method of controlling torque ripple in a switched reluctance motor, the method comprising:
 splitting each phase winding of a switched reluctance motor (SRM) into an AC winding and a DC winding;
 exciting the AC winding of each phase winding with symmetrically displaced sinusoidal currents;
 exciting the DC winding of all phase windings with a varying DC current based on spatially varying magnetic properties of the SRM, wherein exciting the AC winding of each phase winding with sinusoidal currents comprises projecting the phase currents into a reference frame that moves synchronously with the SRM rotor.

12. The method of controlling torque ripple in a switched reluctance motor of claim 11, further comprising calculating the spatially varying magnetic properties of the SRM, wherein the spatially varying magnetic properties of the SRM are represented as $$f(\delta)=1+k_3[\sin(3\delta+\gamma)+\tan(\gamma)\cos(3\delta+\gamma)]+k_6[\sin(6\delta+\gamma)+\tan(\gamma)\cos(6\delta+\gamma)],$$

wherein $\delta$ is angular degrees (position), $k_3$ and $k_6$ are constants, and $\gamma$ is a phase angle.

13. The method of controlling torque ripple in a switched reluctance motor of claim 12, wherein the varying DC current is represented as $i_o=\sqrt{3}If(\delta)$, wherein I is a nominal DC current.

* * * * *